(12) United States Patent
Kudrus (10) Patent No.: US 9,403,402 B2
(45) Date of Patent: Aug. 2, 2016

(54) DEVICE AND METHOD FOR GENERATING POSTAL ITEMS

(71) Applicant: BÖWE SYSTEC GmbH, Augsburg (DE)

(72) Inventor: Heimer Kudrus, Augsburg (DE)

(73) Assignee: BÖWE SYSTEC GMBH, Augsburg (DE)

( * ) Notice: Subject to any disclaimer, the term of this patent is extended or adjusted under 35 U.S.C. 154(b) by 72 days.

(21) Appl. No.: 14/481,973

(22) Filed: Sep. 10, 2014

(65) Prior Publication Data

US 2015/0068160 A1    Mar. 12, 2015

(30) Foreign Application Priority Data

Sep. 10, 2013  (DE) .......................... 10 2013 109 937
May 12, 2014  (DE) .......................... 10 2014 106 655

(51) Int. Cl.
*B43M 3/04* (2006.01)
*B65G 37/00* (2006.01)
(Continued)

(52) U.S. Cl.
CPC .. *B43M 3/04* (2013.01); *B07C 1/00* (2013.01); *B43M 3/00* (2013.01); *B65B 35/50* (2013.01);
(Continued)

(58) Field of Classification Search
CPC ...... B43M 3/00; B07C 1/00; B65H 2511/512
USPC .......... 270/52.02, 58.04, 58.06, 58.23, 58.29; 53/154
See application file for complete search history.

(56) References Cited

U.S. PATENT DOCUMENTS 5,067,088 A * 11/1991 Schneiderhan ............... 700/221

5,478,063 A * 12/1995 Linder et al. ............... 270/58.06
(Continued)

FOREIGN PATENT DOCUMENTS

EP    1942464    7/2008
EP    1997646    12/2008

OTHER PUBLICATIONS

Result of examination reports for German Patent Application No. 102013109937.8 dated Sep. 10, 2013.

*Primary Examiner* — Leslie A Nicholson, III
(74) *Attorney, Agent, or Firm* — Paul D. Bianco; Fleit Gibbons Gutman Bongini & Bianco PL (57) ABSTRACT

A method and a device for generating postal items with: a linearly formed first feed channel for feeding first documents of a postal item, with a first transport device, which transports the first documents in a first transport direction along a first straight transport line; an identification device for identifying the first documents; a second feed channel for feeding second documents of a postal item; an identification device for identifying the second documents; a collecting channel arranged downstream of the first feed channel and downstream of the second feed channel, for receiving first documents or groups of first documents from the first feed channel and/or of second documents or groups of second documents from the second feed channel, wherein the documents received in the collecting channel are collected as document group, wherein each document group forms the content of a postal item; and an envelope stuffing device arranged downstream of the collecting channel, in which the document groups coming from the collecting channel are inserted into an envelope. To achieve a higher throughput of postal items generated, the second transport device deflects the second documents, without stopping the documents, from a second transport direction along a second straight transport line into a third transport direction along a third straight transport line.

12 Claims, 4 Drawing Sheets

(51) Int. Cl.
*B65B 35/50* (2006.01)
*B65B 35/54* (2006.01)
*B43M 3/00* (2006.01)
*B07C 1/00* (2006.01)
*B65H 29/12* (2006.01)
*B65H 39/06* (2006.01)

(52) U.S. Cl.
CPC ........... *B65B 35/54* (2013.01); *B65G 37/00* (2013.01); *B65H 29/12* (2013.01); *B65H 39/06* (2013.01); *B65H 2301/33212* (2013.01); *B65H 2301/33222* (2013.01); *B65H 2301/341* (2013.01); *B65H 2301/4352* (2013.01); *B65H 2301/4454* (2013.01); *B65H 2301/544* (2013.01); *B65H 2404/261* (2013.01); *B65H 2511/512* (2013.01); *B65H 2701/1916* (2013.01)

(56) References Cited

U.S. PATENT DOCUMENTS

| | | | |
|---|---|---|---|
| 5,660,382 A * | 8/1997 | Meier | 270/52.16 |
| 5,681,035 A | 10/1997 | Ifkovits et al. | |
| 6,155,031 A * | 12/2000 | Ballestrazzi et al. | 53/569 |
| 8,118,294 B2 * | 2/2012 | Skinger | 270/52.02 |
| 2008/0291481 A1 | 11/2008 | Haller | |
| 2008/0294284 A1 | 11/2008 | Wiersma et al. | |
| 2011/0170925 A1 | 7/2011 | Wiersma | |

* cited by examiner

DEVICE AND METHOD FOR GENERATING POSTAL ITEMS

FIELD OF THE DISCLOSURE

The disclosure relates to a multichannel device for generating postal items as well as to a method for generating postal items in such a multichannel device.

BACKGROUND OF THE DISCLOSURE

A multichannel device for processing printed documents, in particular a multichannel envelope stuffing machine, is known from EP 1 997 646 A2. This machine comprises a first feed device and a second feed device as well as a handling station. The two feed devices each have a linear transport channel for printed documents, wherein the transport channel of the first feed device and the transport channel of the second feed device are arranged mutually perpendicular in some sections. Downstream of the transport channel of the first feed device, in a linear extension of the transport channel of this feed device, a merging station is arranged, in which the printed documents coming from the transport channel of the first feed device and the printed documents coming from the transport channel of the second feed device are merged. Downstream of the merging station, at least one insert station is arranged, in which inserts associated with printed documents can be added. The insert station(s) is/are adjoined by an envelope stuffing station, in which the documents collected in the merging station are combined into groups or stacks, or inserted together with the inserts added in the insert station into an envelope. Both the first feed device and also the second feed device are in each case associated with a reading station, by means of which the information associated with the printed documents is read and supplied as signals to a system control. The system control controls the system and in particular the transport of the printed documents from the two feed devices to the envelope stuffing station in accordance with the information that has been read out.

The known machine has been found to be disadvantageous with regard to its efficiency and its throughput, because, for the merging of the printed documents from the transport channel of the first feed device with the printed documents from the transport channel of the second feed device, the transport of the printed documents has to be interrupted (intermittently), so that the printed documents from the first feed device can be merged with the printed documents from the second feed device in the merging station. As a result of the clocked stopping of the transport of the printed documents in the transport channel of the first feed device or in the transport channel of the second feed device, and of the subsequent startup of the transport of the printed documents in the merging station, the throughput speed and thus the throughput of the machine decrease. Due to the arrangement of the transport channels of the first feed device and of the second feed device at right angles to one another in some sections, it is indeed necessary to deflect the movement direction of the printed documents coming from the transport channel of a given feed device by 90°, which requires stopping the transport of the printed documents coming from this feed device.

SUMMARY OF THE DISCLOSURE

The disclosure is based on the problem of indicating a device and a method for generating postal items by means of which a higher throughput of the generated postal items can be achieved. Here, a synchronous processing of documents (particularly printed documents) from two or more feed channels is made possible.

These problems are solved by embodiments of the device and method as disclosed herein. Other embodiments of the devices and of the methods are also disclosed.

The device according to the disclosure for generating postal items comprises a linearly formed first feed channel for feeding first documents of a postal item, with a first transport device, which transports the first documents in a first transport direction along a first straight transport line, an identification device for identifying the first documents, a second feed channel for feeding second documents of a postal item, an identification device for identifying the second documents, a collecting channel arranged downstream of the first feed channel and downstream of the second feed channel for receiving first documents or groups of first documents from the first feed channel and/or second documents or groups of second documents from the second feed channel, wherein the documents received in the collecting channel are collected as document groups, wherein each document group forms the content of a postal item, an envelope stuffing device arranged downstream of the collecting channel, in which the document groups coming from the collecting channel are inserted into an envelope.

According to the disclosure, the second transport device is arranged so that the second documents are deflected without stopping of the documents from a second transport direction along a second straight transport line into a second transport direction along a third straight transport line.

For this purpose, the second transport device transports the second documents first at least in some sections linearly in a horizontal position along the second straight transport line, and it brings the second documents into at least one substantially vertical position in order to deflect them in the vertical position from the second transport direction into the third transport direction and finally turn them back again into a horizontal position.

In an embodiment example, the second straight transport line and/or the third straight transport line is/are parallel to and some distance from the first straight transport line, and the second and the third straight transport lines extend substantially parallel to one another. In order to deflect the second documents from the second transport direction into the third transport direction, the documents in this embodiment are deflected in their vertical position first starting from the second transport direction by a deflection angle of preferably more than 90° and in particular of approximately 120°, and are moved farther in this direction a predetermined path distance in the direction of the first feed channel and then deflected a second time by the same deflection angle and are moved farther in the third transport direction, so that the second documents are then transported further substantially along the third straight transport line and parallel to the first transport direction (that is to say the transport direction of the first documents). The third straight transport line here extends above and at a vertical distance from the first straight transport line, along which the first documents are transported.

To merge the first documents and the second documents in the collecting channel, the latter is advantageously formed linearly and as an extension of the first feed channel and extends along the first straight transport line. Finally, the second documents are led at a slant via a ramp-shaped transport section from the third transport direction downward onto the collecting channel, and there they are merged with the first documents or document groups of first documents, in order to form with the latter a document group constituting the content of a postal item.

In a preferred embodiment example, the second transport device comprises a twisted transport band, which grips the second documents in order to bring them from the horizontal position into an at least substantially vertical position and back again into their horizontal position. Advantageously, the transport band is a crossed belt with two adjacent bands, between which the second documents are gripped.

The identification device is used for identifying the first documents and the second documents and it is formed, for example, by reading devices that are capable of reading information applied on the documents regarding their identity, which is optionally present in plain writing or also in the form of codes. Advantageously, a first reading device associated with the first feed channel is provided for reading the first documents, and a second reading device associated with the second feed channel is provided for reading the second documents. However, instead of using reading devices, it is also possible to determine the identity of the first documents and of the second documents by using a database that contains information on the identity of all the documents, in particular information on whether they belong to the first or to the second documents, and on whether they belong to a certain postal item.

In an embodiment example, in the device according to the disclosure, a first collecting station is associated with the first feed channel and groups the first documents to form groups of first documents. Accordingly, a second collecting station, which groups the second documents to form groups of second documents, can also be associated with the second feed channel. The document groups (S) collected in the collecting channel, which form one postal item, here each contain first documents and second documents, wherein the first documents and the second documents are different.

The method according to the disclosure for generating postal items thus comprises the following steps:
  feeding of first documents or of a group of first documents along a first feed channel,
  identifying at least one of the first documents with an identification device, in particular with a reading device associated with the first feed channel,
  feeding of second documents or of a group of second documents along a second feed channel,
  identifying at least one of the second documents with an identification device, in particular with a reading device associated with the second feed channel,
  transferring the first documents or of the group of first documents from the first feed channel to a collecting channel arranged downstream of the first feed channel, with no stopping of the first documents,
  transfer of the second documents or of the groups of second documents from the second feed channel to the collecting channel arranged downstream of the second feed channel with no stopping of the second documents, wherein the documents received in the collecting channel are collected as document group, each document group forms the content of a mail shipment and contains first documents and/or second documents,
  passing on the document group in the collecting channel to an envelope stuffing device arranged downstream of the collecting channel,
  in the envelope stuffing device, insertion of the document group coming from the collecting channel into an envelope to form a postal item.

In the method according to the disclosure, the first documents and the second documents in the feed channels and in the collecting channel are transported preferably up to the transfer to the envelope stuffing device with no stopping of the documents. This ensures that the documents can be transported from the feed channels to the envelope stuffing device without interruption of the transport in a continuous document stream, as a result of which the throughput of the method can be increased considerably.

BRIEF DESCRIPTION OF THE DRAWINGS

These and further advantages of the disclosure result from the embodiment example described below in reference to the accompanying drawings. The drawings show.

DETAILED DESCRIPTION OF THE DISCLOSURE

Figure 1:
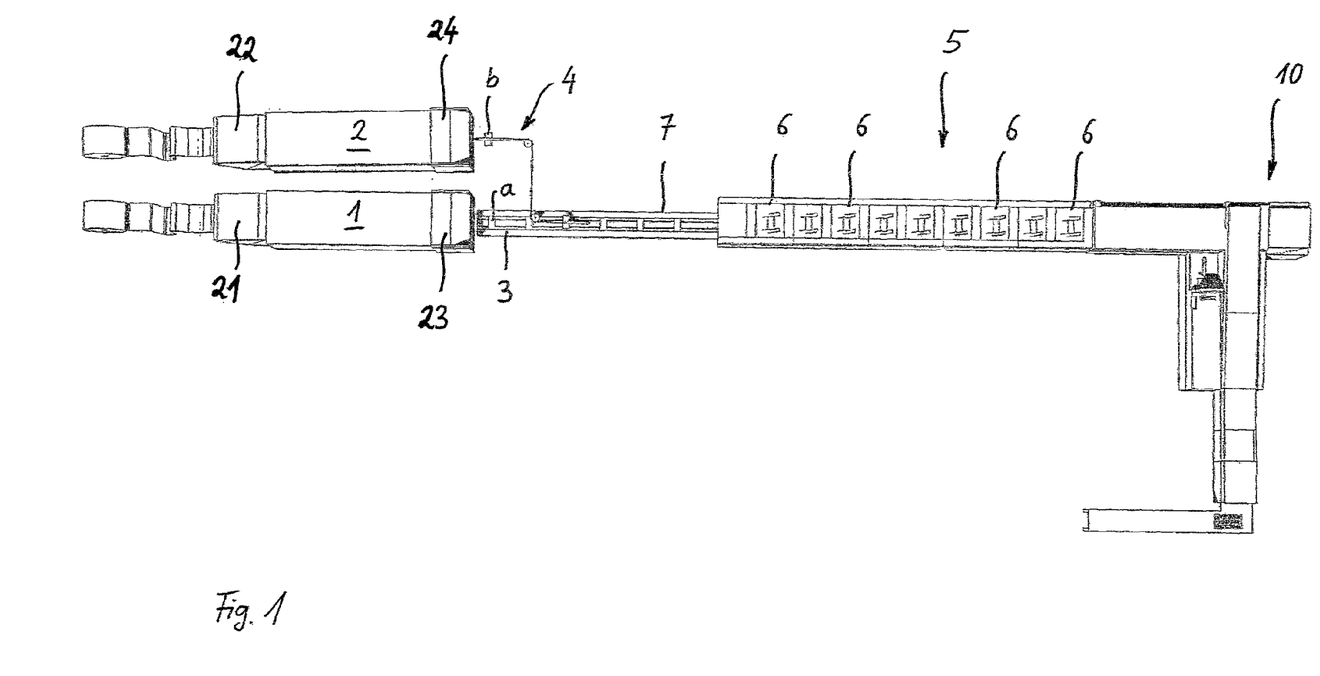
FIG. 1: a device according to the disclosure in a top view.

In FIG. 1, an embodiment example of a device for generating postal items is shown in a top view. This device is a two-channel machine with an envelope stuffing device 10. Two document streams are fed to the envelope stuffing device 10. For this purpose, the device has a first feed station 1 and a second feed station 2. In the two feed stations 1, 2, the document streams fed to the envelope stuffing device 10 are generated and assembled. Each document stream here consists, for example, of printed sheets, which can be, in particular, personalized documents of different types and/or different formats. The two feed stations 1, 2 can comprise printers, cutters, mergers or sheet feeders, for example, for generating and assembling the document streams. Moreover, each one of the feed stations 1, 2 can have one or more collecting stations 23, 24 in order to collect documents in groups and, for example, group them in the form of document stacks. For the transport of the documents or of the groups of documents, each feed station 1, 2 contains a transport device. Moreover, the feed stations 1, 2 can contain devices for folding documents (particularly printed sheets) or groups of documents, as well as turning devices for turning the documents. Furthermore, in each feed station 1, 2, an identification device 21, 22 for identifying the documents is included. The identification devices 21, 22 here are reading devices 21, 22, by means of which the transported documents can be read and thereby identified during the transport. Advantageously, the identification devices 21, 22 consist of a reading device for reading codes, such as, for example, bar codes or QR codes, which are applied to the documents. However, the identification devices 21, 22 can also be scanners that can scan text applied to the documents, and acquire and process it by means of a text recognition device. The information read by means of the identification devices 21, 22 is used for controlling the device and in particular for assembling groups of documents in the feed stations 1 and 2.

Figure 2:
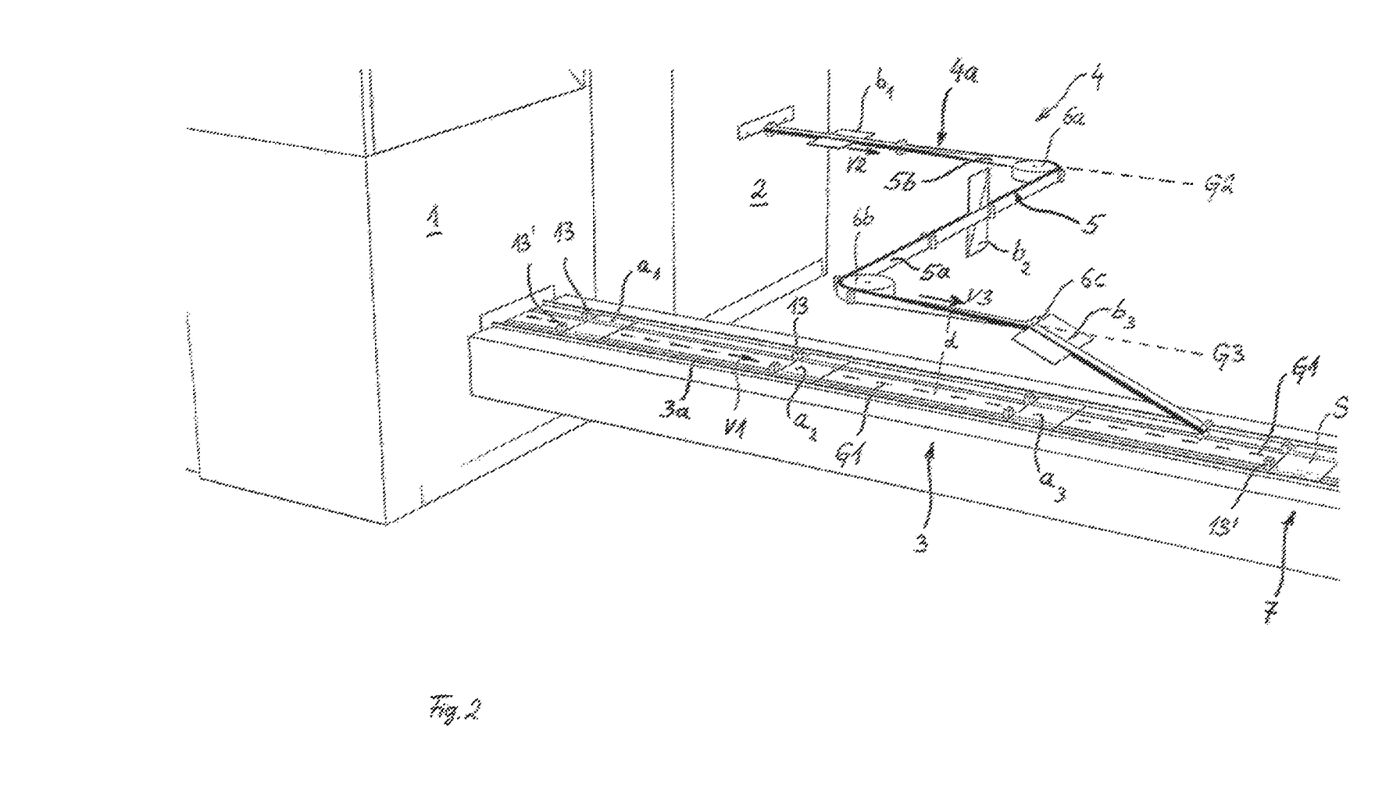
FIG. 2: perspective side view of the feed channels of the device of FIG. 1.

The documents or groups of documents generated or processed in the feed stations 1, 2 are conveyed in the feed stations 1, 2 with a transport device in a transport direction, wherein the individual documents or groups of documents rest on the transport device at a small distance from one another in the transport direction and, as a result, form a document stream. On the transport device, the document streams are transported from the respective feed station 1, 2 to a feed channel 3, 4 arranged downstream of the respective feed station 1, 2, and are transferred to the respective associated feed channel 3 or 4. The feed channel 3 is a linear transport channel, which transports the document streams of first documents a transferred to it from the associated feed station 1 along a first straight transport line G1 in a first transport direction v1 (FIG. 2). For this purpose, the first feed channel 3 is provided with a transport device 3*a* or a driven transport band or transport rollers or, as shown in FIG. 2, with driven entrainers 13. The first documents conveyed in series from the first feed station 1 are transferred in horizontal position to the first feed channel 3, and transported farther by the transport device 3*a* linearly in the first transport direction v1.

The second feed station 2 is followed downstream by the second feed channel 4, which takes over the second documents b conveyed in series from the second feed station 2, in a horizontal position, and first transports them farther at least in some sections in a second transport direction v2 along a second straight transport line G2, and subsequently deflects the second documents b in a third transport direction v3 along a third straight transport line G3 (FIG. 2). The third straight transport line G3, along with the second straight transport line G2, is located in a plane and extends here, as can be seen in FIG. 2, at least substantially parallel and at a vertical distance d relative to the first straight transport line G1.

At the end of the first feed channel 3, a collecting channel 7 is arranged. In the embodiment example shown in FIGS. 1-4, the collecting channel 7 is formed by an extension of the first feed channel 3 in the first transport direction v1 (along the first straight transport line G1), so that the collecting channel extends collinearly with respect to the first feed channel 3. The document streams (first documents a) from the first feed station 1 and the document streams (second documents b) from the second feed station 2 are fed to the collecting channel 7, without the documents being stopped in the process. The fed documents or groups of documents are transferred without stopping to the collecting channel 7 and grouped and collected in the collecting channel 7 to form document groups S. Advantageously, the document groups S are stacked in the collecting channel 7 to form document stacks. Here it is also possible to transfer, in individual cycles, just selectively, either only first documents a from the first feed channel 3 or only second documents b from the second feed channel 4 to the collecting channel 7, so that a document group (document stack) S is formed consisting only of first documents a or only of second documents b. For this purpose, the transport device 3*a* of the first feed channel 3 or the transport device 4*a* of the second channel 4 can optionally be stopped (clocked), so that, in this operational cycle, no document is transferred from this feed channel to the collecting channel 7. For this purpose, it is also possible to transfer the first or the second documents with delays or gaps from the input channels 1 and 2 to the respective associated feed channel 3 or 4, so that, in a feed channel 3 or 4, corresponding gaps in the document stream form. In this case, it is possible to continue to run the transport devices 3*a* or 4*a* of the feed channels 3 or 4 in continuous operation.

The first documents a of the document stream coming from the first feed station 1 and the second documents b of the document stream coming from the second feed station 2 are, as a rule, customized documents. Therefore, reference is made below to first documents a or groups of first documents and to second documents b or groups of second documents, wherein the first documents a come from the first feed station 1 and the second documents b come from the second feed station 2. Based on the reading of document information by means of the reading devices, the identity of the individual documents of the two document streams is known, and the integrity of the document is ensured, so that the control unit of the device can control the transport of the individual documents a, b and their grouping in document groups (or document stacks) S in accordance with the information read.

Downstream of the collecting channel 7, a collation track 5 with several insert feeders 6 is arranged. In the collation track 5, associated inserts can be added to the documents or to the groups of documents that are transferred from the collecting channel 7. The inserts are located here in the insert feeders 6, and from there they are added to the documents or document groups located in defined cases of the collation track 5.

The collation track 5 is followed downstream by the envelope stuffing device 10 in which the document groups (document stacks) S coming from the collecting channel 7 and from the collation track 5 are inserted into envelopes. Each document stack S generated in the collecting channel 7 and to be associated in the collation track 5, optionally with associated inserts from the insert feeders 6, here represents the content of a postal item that is inserted in an envelope in the envelope stuffing device 10.

As can be seen from the top view of the device according to the disclosure in FIG. 1, the linearly formed first feed channel 3, which is associated with the first feed station 1, runs in the extension to the subsequent downstream collation track 5. The downstream end section of the first feed channel 3 here forms the collecting channel 7, which extends accordingly collinearly with respect to the linear first feed channel 3 and the also linearly constructed collation track 5.

As can be seen in the detailed representation of FIG. 2, the second feed channel 4 extends above the first feed channel 3. At the downstream end of the second feed channel 4, the second documents b are led at a slant downward in the direction of the first feed channel 3 arranged beneath, and there they are merged with the first documents a associated in a document group S in order to form the content of a postal item. For this purpose, the second documents b are placed from above on the first documents a located in the first transport device 3*a* so as to form a stack, in order to form a document group S in the form of a document stack.

Figure 3:
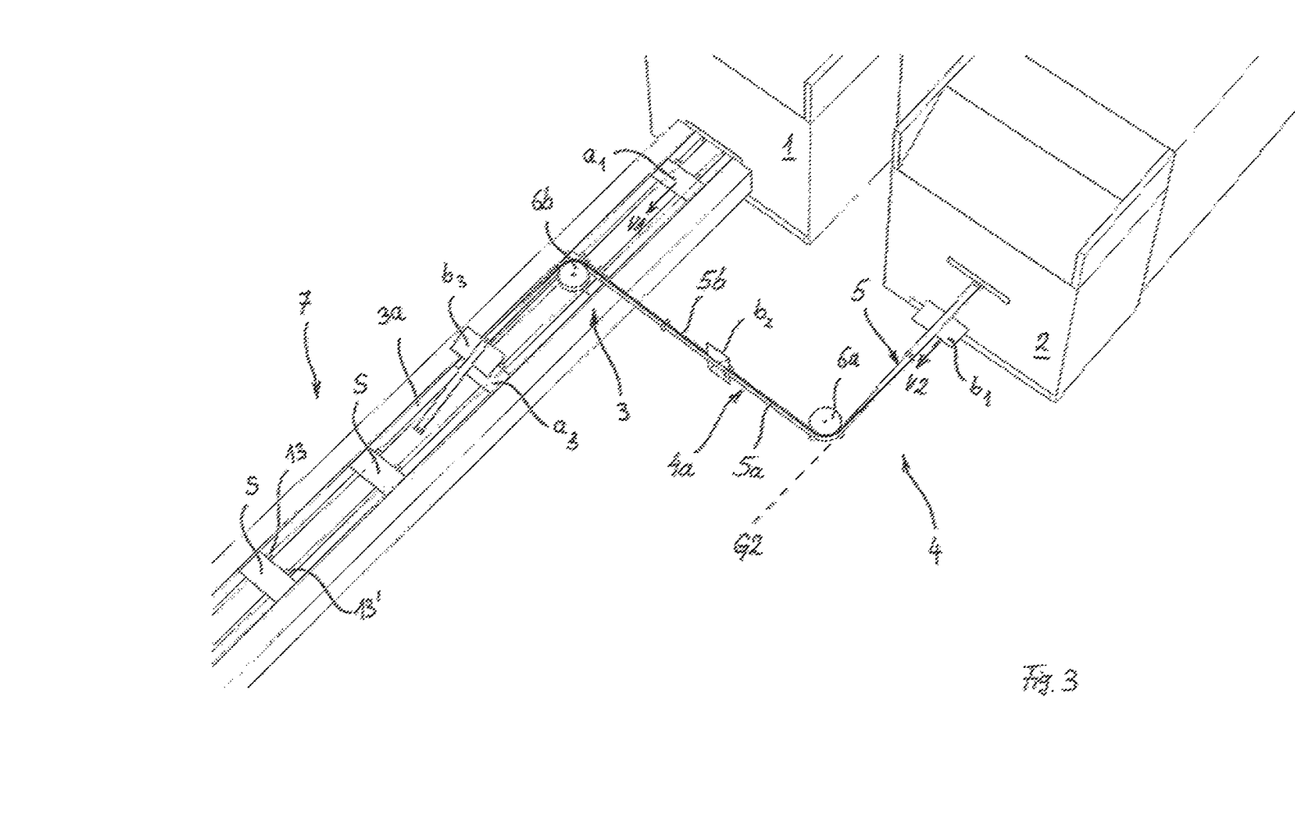
FIG. 3: perspective top view of the feed channels of the device according to FIG. 1.
Figure 4:
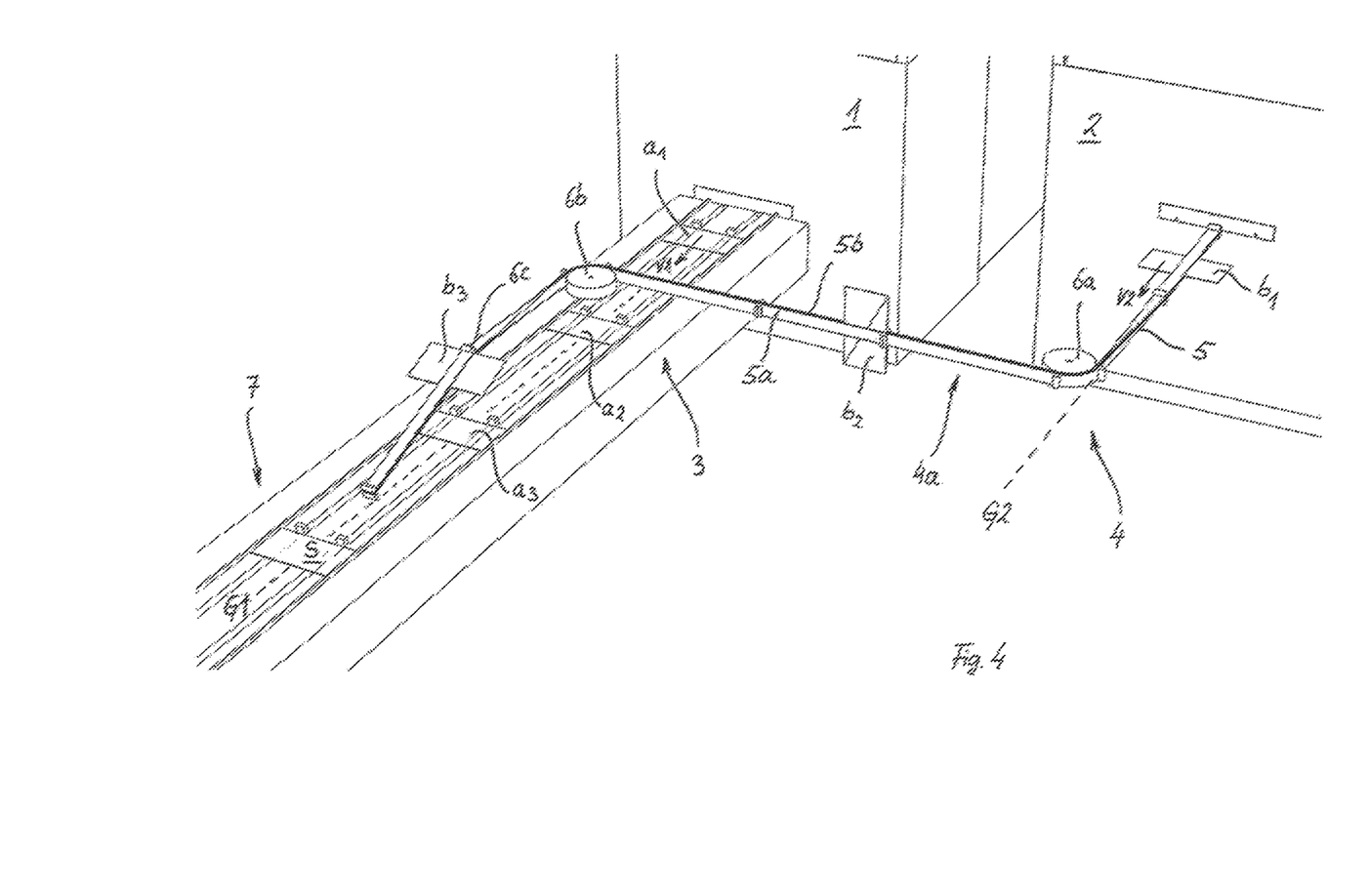
FIG. 4: perspective front view of the feed channels of the device of FIG. 1.

In the detailed representation of FIGS. 2-4, the first feed channel 3 and the second feed channel 4 are shown in detail. For transporting the first documents a (or document groups), the first feed channel 3 has moving entrainers 13, 13' that are arranged in pairs next to one another, transversely to the first transport direction v1, and which protrude beyond a transport surface. In the first transport direction v1, at a distance from one another, entrainer pairs 13, 13' define here a deposition case of the first transport device 3*a* or of the collecting channel 7 transitioning therein, in which the first documents a or the document groups S collected in the collecting channel are deposited. In the embodiment example of FIG. 2, in the area of the first transport device 3*a*, three first documents (a1, a2, a3) are placed in successive cases, and in the area of the collecting channel 7, a collected document group S is placed as document stack.

In the second feed channel 4, the second documents b are transported by means of the second transport device 4*a*. The second transport device 4*a* comprises a twisted and driven transport band 5, which grips the second documents b in order to bring them from their original horizontal position into an at least substantially vertical position and back again into their horizontal position. The transport band 5 can be, for example, a vacuum band that suctions the second documents b or, as shown in FIG. 2, a crossed belt with two adjacent bands 5a, 5b between which the second documents b are gripped.

As can be seen in FIGS. 2-4, the second transport device 4a transports the second documents b first at least in some sections linearly in a horizontal position in a second transport direction v2 along the second straight transport line G2, and it subsequently brings the second documents b into an at least a substantially vertical position by means of the twisted transport band 5. In the embodiment example of FIG. 2, three successive second documents (b1, b3, b3 [sic]) are shown, wherein the document (b1) located farthest upstream is in its (original) horizontal position from which it was transferred from the second feed station 2 to the second feed channel 4, and the document preceding it (b2), viewed in the stream direction, is in the turned vertical position.

As can be seen in FIG. 2, the transport band 5 is led around a first deflection roller 6a and around a second reflection roller 6b. The outer circumference of the first deflection roller 6a is located here on the second straight transport line G2 and the outer circumference of the second deflection roller 6b is located on the third straight transport line G3. As a result, a document (for example, document b2) turned by the twisted transport band 5 into a vertical position is deflected by the transport device 4a during the transport along the second feed channel 4 from the second transport direction v2 (which extends along the second straight transport line G2) first substantially perpendicularly toward the adjacent second feed channel 3 [sic; 4]. Subsequently, an additional deflection occurs by a deflection angle of preferably more than 90°, and in particular approximately 120°, wherein the second document b is always in the vertical position during these deflections. The second deflection here occurs in a third transport direction v3, which extends along the third straight transport line G3. This third transport direction v3 is at least substantially parallel to the first transport direction v1 in which the first documents a are transported along the first feed channel 3. During the transport of the second documents b in the third transport direction v3, these documents are again twisted by the twisted transport band 5 back into a horizontal position.

In the downstream area, the transport band 5 is led around a third deflection roller 6c, which is arranged in the third transport direction v3 downstream of the second deflection roller 6b, and which deflects the transport band 5 at a slant downward in the direction of the first transport device 3a. The downstream end of the transport band 5 is here positioned just above the first transport device 3a. As a result of this guiding of the transport band 5, the second documents b are finally deflected from the third transport direction v3 and (in horizontal position) led downward in the direction of the first transport device 3a located beneath. In FIG. 2, b3 shows a second document that (in horizontal position) is deflected from the third transport direction v3 downward and led in the direction of the first transport device 3a. The second documents b then leave the downstream end of the transport band 5 to be deposited in the collecting channel 7 in a case, for example, on a first document a or a group of first documents already located in the case. In this manner, the first documents a from the first feed station 1 and the second documents b from the second feed station 2 with positional conformity (i.e., covering one another) are merged in order to form a coherent document group S. Advantageously, the documents forming a coherent document group S here are stacked in a case of the collecting channel 7 to form a document stack.

The disclosure is not limited to the embodiment represented here graphically. Thus, for example, the second straight transport line G2 can also extend at an angle with respect to the first straight transport line G1 or with respect to the third straight transport line G3. Moreover, it is possible for the second documents b to be transported, after leaving the second feed station 2, first not yet along the second straight transport line G2, but in another transport direction, and to be deflected only then into the second transport direction v2 along the second straight transport line G2. It is also not compulsory for the second documents b to be transported in the second feed channel in the second and third transport direction v2 or v3, in a horizontal plane parallel to the transport plane of the first feed channel, i.e., the second transport direction v2 and/or the third transport direction v3 can also extend in a manner that is not parallel to the first transport direction v1. Furthermore, the transport device of the first feed channel 3 can be formed differently than shown here and, for example, it can comprise one or more driven transport belts, in particular a vacuum band, on which the first documents a are placed and transported in the first transport direction v1.

What is claimed is:

1. A device for generating postal items, comprising:
   a linear first feed channel for feeding first documents of a postal item, the first feed channel including a first transport device, which transports the first documents in a first transport direction along a first straight transport line, and a first identification device for identifying the first documents;
   a second feed channel for feeding second documents of a postal item, the second feed channel including a second transport device, which transports the second documents in a second transport direction along a second straight transport line, and a second identification device for identifying the second documents;
   a collecting channel arranged downstream of the first feed channel and downstream of the second feed channel, for receiving first documents or groups of first documents from the first feed channel and/or of second documents or groups of second documents from the second feed channel, wherein the documents received in the collecting channel are collected as document groups, wherein each document group forms the content of a postal item;
   an envelope stuffing device arranged downstream of the collecting channel, in which the document groups coming from the collecting channel are inserted into an envelope;
   wherein the second transport device turns the second documents, without stopping the documents, from the second transport direction into a third transport direction along a third straight transport line; and
   wherein the second transport device transports the second documents first at least in some sections linearly in a horizontal position along the second straight transport line, brings the second documents into at least a substantially vertical position, then turns them from the second transport direction into the third transport direction, and finally returns them again into a horizontal position.

2. The device according to claim 1, wherein the third straight transport line extends parallel to and at a distance from the first straight transport line.

3. The device according to claim 1, wherein the second straight transport line and the third straight transport line extend in a plane and in particular substantially parallel to one another.

4. The device according to claim 1, wherein the third straight transport line extends above and a vertical distance from the first straight transport line.

5. The device according to claim 1, wherein the second transport device has a twisted transport band that grips the second documents, in order to bring them from a horizontal position into an at least substantially vertical position and back again into a horizontal position.

6. The device according to claim 5, wherein the transport band is a crossed belt with two adjacent bands, between which the second documents are gripped.

7. The device according to claim 1, wherein the first identification device for identifying the first documents is formed by a reading device associated with the first feed channel for reading the first documents and/or the second identification device for identifying the second documents is formed by a reading device associated with the second feed channel for reading the second documents.

8. The device according to claim 1, wherein the first feed channel is associated with a first collecting station, which groups the first documents to form groups of first documents and/or wherein the second feed channel is associated with a second collecting station, which groups the second documents to form groups of second documents, wherein the document groups collected in the collecting channel in each case contain first documents and second documents, wherein the first documents and the second documents are different.

9. A method for generating postal items comprising:
feeding of first documents or of a group of first documents along a first feed channel;
identifying at least one of the first documents with an identification device, particularly with a reading device associated with the first feed channel;
feeding of second documents or of a group of second documents along a second feed channel;
identifying at least one of the second documents with an identification device, in particular with a reading device associated with the second feed channel;
transferring the first documents or the groups of first documents from the first feed channel to a collecting channel arranged downstream of the first feed channel, with no stopping of the first documents;
transferring the second documents of the group of second documents from the second feed channel to the collecting channel arranged downstream of the second feed channel, with no stopping of the second documents, wherein the documents received in the collecting channel are collected as document group, each document group forms the content of a postal item and contains first documents and/or second documents;
routing the document group in the collecting channel to an envelope stuffing device arranged downstream of the collecting channel;
in the envelope stuffing device, insertion of the document groups coming from the collecting channel in an envelope for the formation of a postal item;
wherein the first documents are transported in the first feed channel by a first transport device linearly in a first transport direction, and the second documents are turned in the second feed channel, without stopping the documents, from a second transport direction along a second straight transport line into a third transport direction along a third straight transport line; and
wherein the second documents are transported along the second feed channel first linearly in a horizontal position along the second straight transport direction and are subsequently brought into an at least substantially vertical position and are then deflected from the second transport direction into the third transport direction and are subsequently brought back again into a horizontal position.

10. The method according to claim 9, wherein the first documents and the second documents are transported without stopping the documents in the first and second feed channels, respectively, and in the collecting channel until their routing to the envelope stuffing device.

11. A device for generating postal items, comprising:
a linear first feed channel for feeding first documents of a postal item, the first feed channel including a first transport device, which transports the first documents in a first transport direction along a first straight transport line and a first identification device for identifying the first documents;
a second feed channel for feeding second documents of a postal item, the second feed channel including a second transport device, which transports the second documents in a second transport direction along a second straight transport line, and a second identification device for identifying the second documents;
a collecting channel arranged downstream of the first feed channel and downstream of the second feed channel, for receiving first documents or groups of first documents from the first feed channel and/or of second documents or groups of second documents from the second feed channel, wherein the documents received in the collecting channel are collected as document groups, wherein each document group forms the content of a postal item;
an envelope stuffing device arranged downstream of the collecting channel, in which the document groups coming from the collecting channel are inserted into an envelope;
wherein the second transport device turns the second documents, without stopping the documents, from the second transport direction along a second straight transport line into a third transport direction along a third straight transport line; and
wherein the second transport device has a twisted transport band that grips the second documents, in order to bring them from a horizontal position into an at least substantially vertical position and back again into a horizontal position.

12. The device according to claim 11, wherein the transport band is a crossed belt with two adjacent bands, between which the second documents are gripped.

* * * * *